Nov. 16, 1948.  E. T. BIRSCH ET AL  2,454,124
SERIES FILTRATION
Filed April 25, 1946
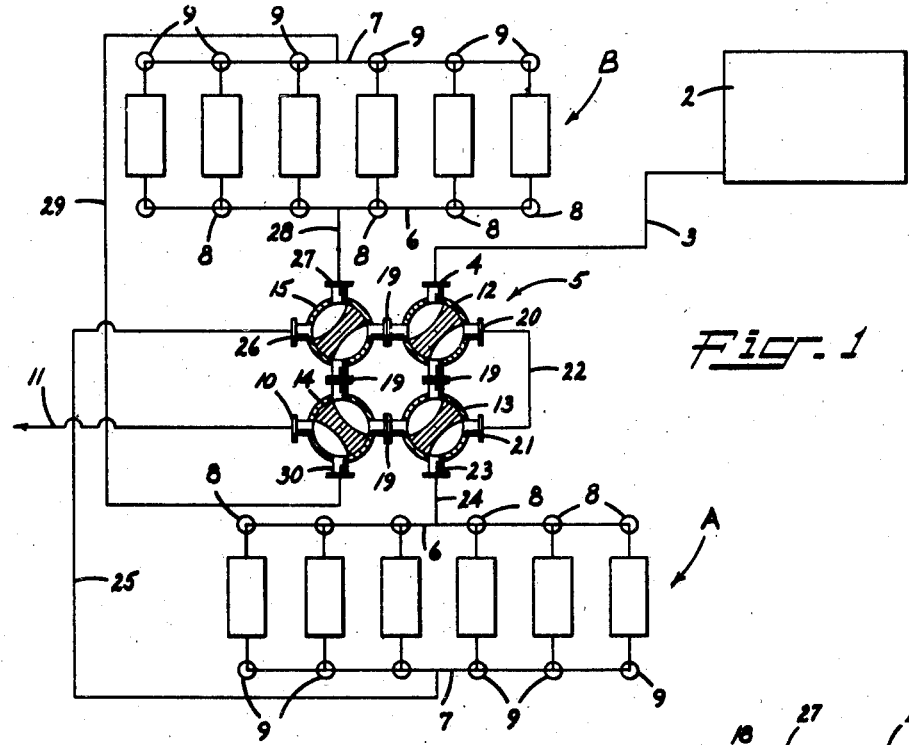
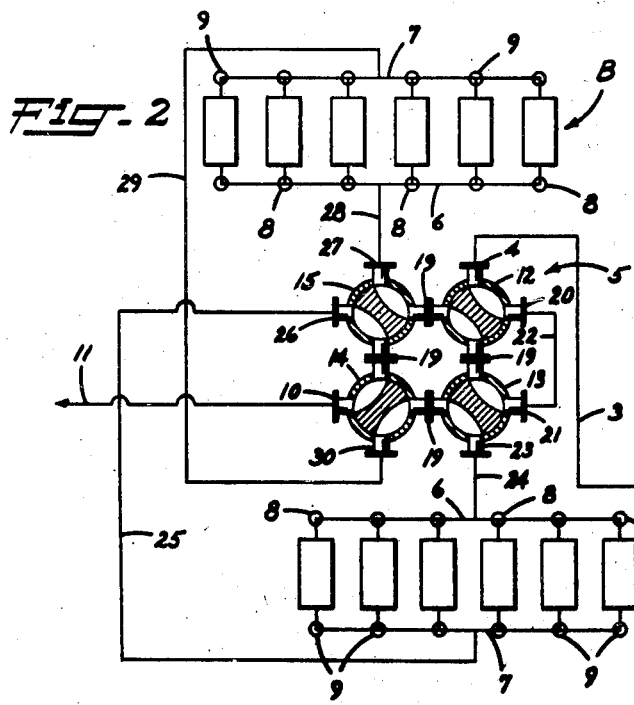
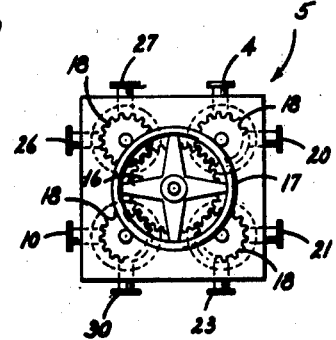
INVENTORS.
EDWIN T. BIRSCH
WILLIAM D. SILCOX
BY
Thomas R. O'Malley Patented Nov. 16, 1948

2,454,124

UNITED STATES PATENT OFFICE 2,454,124

SERIES FILTRATION

Edwin T. Birsch and William D. Silcox, Lewistown, Pa., assignors to American Viscose Corporation, Wilmington, Del., a corporation of Delaware Application April 25, 1946, Serial No. 664,879

2 Claims. (Cl. 210—62)

This invention relates to the filtration of dispersion through two or more sets of filters in sequence and is particularly concerned with a system for insuring the best possible filter action continuously while cutting out at intervals the exhausted filters for cleaning.

Accordingly, the invention provides an improved method and apparatus for filtering which provides continuous filtration while permitting cutting out each filter at intervals for cleaning as it becomes completely clogged or exhausted, and what is most important the restoring of the cleaned filters to a position in the filtration system always in advance of the more seasoned or partially clogged filters currently operating at the time of such restoration of cleaned filters to the system. By restoring the cleaned filters in advance of the more seasoned filters, the best possible filtration is maintained, since the cleaned filters have a somewhat larger pore size and would take out the largest particles, so that the smaller particles in the dispersion which leaves the relatively clean filters are removed in the latter or last stages or stage of filtration in which the seasoned filters are used exclusively. Other objects and advantages of the invention will be apparent from the drawing and the description thereof hereinafter.

In the drawing, which is illustrative of the invention,

Figure 1 illustrates diagrammatically a preferred filtration apparatus for carrying out the filtration system;

Figure 2 is a similar diagrammatic view of the same apparatus with the relations between the sets of filters reversed; and Figure 3 is a plan view showing the reversing valve system.

The invention may be applied to the filtration of dispersions of any sort whatsoever and one particular use for which the system is advantageous is for the filtering of a viscose solution as it is forced from spinning tanks to artificial filament spinning machines, the filters being interposed in the line from the tanks to the machines.

With reference particularly to Figure 1, the dispersion, such as of viscose, may proceed from a supply tank 2, such as one or more spinning tanks, through a line 3 to one port 4 of the reversing valve system designated generally by the reference character 5. From this reversing valve system the dispersion proceeds through two sets of filters A and B in either sequence depending upon the setting of the reversing valve 5. Each set of filters comprises at least two individual filters (six being shown in each set). The filters of each set are connected in parallel and are preferably of the closed pressure type. For example, any sort of filter press may be provided, such as a rotary leaf press, or a plate and frame press, and these filters may or may not be provided with washing connections. As shown, a simple, non-washing, plate and frame press may be used.

Set A of filters has a supply header 6 and a discharge header 7. Each of the connections 8 and 9 which the branch lines to each filter make with the headers is provided with a three-way cock or valve. Similar connections are provided for the set of filters B. The dispersion leaves the valve reversing system through a port 10 and may proceed to any subsequent stage, such as a storage tank, or in the case of viscose, to the spinning machines through a line 11.

The reversing valve system 5 comprises a set of four 4-way valves or cocks 12, 13, 14 and 15. Each valve or cock has four ports and each valve may be disposed at the corner of a square as shown, to facilitate simultaneous operation by means of a common gear 16 (see Figure 3) which may be driven by a hand wheel 17 and four gears meshing with the common gear 16. Each of the four gears 18 is secured to the stem of one of the four 4-way valves.

The opposed ports of adjacent valves are connected as at 19, whereas the lateral ports 20 and 21 of valves 12 and 13 are connected by a pipe 22. The port 23 is connected to the supply header of the set of filters A by a conduit 24. The discharge header of the set of filters A is connected by a pipe 25 with the port 26 of valve 15 and the port 27 of valve 15 is connected by a line 28 with the supply header of the set of filters B. The discharge header of the set of filters B is connected by a line 29 to the port 30 of valve 14 and, as stated before, port 10 of valve 14 is connected with line 11 for discharging the filtered dispersion from the system.

Figure 1 shows one setting of the reversing valve 5 by which the dispersion supplied to it through line 3 is sent first through the set of filters A and then through the set of filters B and is finally discharged from the system through line 11. In Figure 2, the individual valves of reversing valve 5 are turned through a 90° angle clockwise as viewed in Figures 1 and 2 so that the dispersion supplied through line 3 is directed first through the set of filters B and then through the set of filters A and ultimately is discharged from the system through line 11 as before.

The manipulation of the system during filtration is as follows: At the start of filtration, both sets of filters A and B may be clean, or the set of filters B may be partially clogged. Assuming that both start out in clean condition with the valve setting in the position of Figure 1, the set of filters A will do practically all of the filtering at the start. When the set of filters A has become partially clogged, such as by allowing a substantial period of filtering to occur, say from ¼ to ½ of the normal useful filtration period of the filters, the individual valves of the reversing valve 5 are turned clockwise through 90° into the position shown in Figure 2 so that the dispersion passes first through the less clogged filters B and then through the more completely clogged filters A. This assures the best efficiency of filtration since both sets of filters are working, filters B removing the larger particles and filters A removing the finer particles. When filters A approach near the end of their useful filtering period, i. e., when they may be said to be exhausted or nearly completely clogged, it is necessary to clean them. At this time, one or more but not all of the filters A may be cut out of the set by closing the cocks 8 and 9 against the branch line or lines to the filters. The filters thus cut off may be cleaned but they cannot be restored until the reversing valve 5 has been turned into the position shown in Figure 1, this being done by turning the individual valves counterclockwise through 90° as viewed in Figure 2. If desired, the reversing valve may thus be turned back into the position of Figure 1 before any of the filters A are cut out for cleaning. By restoring the clean filters in the set of filters A after the valve 5 has been turned back into the position of Figure 1, the dispersion will pass through clean filters first and then through partially clogged filters of the set B, thereby maintaining again the best filtration efficiency. While the valve 5 is in the position of Figure 1, all of the remaining dirty filters in the set A may be cut out one or more at a time until all have been cleaned, it being essential only to maintain one or more of the set whether clean or dirty in the line to maintain continuity of flow.

Coming back to the situation in which the system is operating with the reversing valve in the setting shown in Figure 1 and in which the set of filters B were started in an initially clogged condition, whereas the set of filters A are clean or in a relatively clean condition as compared to the filters B, the setting of valve 5 may remain as shown in Figure 1 until nearly the end of the useful filtration period of the filters B. At this time when such filters have almost reached the maximum permissible clogging, cleaning is in order. As in the case mentioned before, one or more of the filters B may be cut out before or after the reversing valve 5 is turned into the position shown in Figure 2 while maintaining continuity of flow through the balance of the dirty filters in the set B. However, before the cleaned filters are restored to the set, the reversing valve 5 must be turned to the position in Figure 2, so that the dispersion is first directed through the filters B and then through filters A which by this time have become partially clogged. After the valve 5 has been turned to the setting of Figure 2, the balance of the dirty filters in the set B can be cleaned and restored to service in the set after cleaning.

Whereas the preceding description indicates that tank 2 is a supply tank and line 11 is the discharge line from the filtering system, it is clear that the dispersion to be filtered could as well be supplied through line 11 and discharged from the filter system through line 3, and the reversing valve 5 would be shifted between the settings of Figure 1 and Figure 2 in the same manner as in the preceding description for accomplishing the same highly efficient filtration.

It will thus appear that the invention provides a simple procedure and arrangement for maintaining the highest efficiency of filtration in a system comprising a series of two or more sets of parallel-connected filters. The procedure assures that whenever cleaning filters are restored to operation, they will always be the first through which the dispersion is passed.

It is to be understood that changes and variations may be made without departing from the spirit and scope of the invention as defined in the appended claims.

We claim:

1. Apparatus for filtering dispersions comprising a set of filters connected in parallel between a supply header and a discharge header therefor, a second set of filters connected in parallel between a supply header and a discharge header therefor, a supply conduit, a discharge conduit, a set of four four-way valves arranged at the corners of a quadrilateral conduit system, each valve having four ports, of which two are connected with the adjacent ports of the adjacent valves, the third port of two adjacent valves being connected together, the remaining port of one of the last-mentioned adjacent valves being connected to the supply conduit, the remaining port of the other of the last-mentioned adjacent valves being connected to the supply header of the second set of filters, the adjacent port of another valve adjacent the last-mentioned valve being connected to the discharge header of the first set of filters, the remaining port of said other valve being connected to the discharge conduit, a third port of the remaining valve adjacent the last-mentioned port being connected to the discharge header of the second set of filters, and the remaining port of the last-named valve being connected to the supply header of the first set of filters.

2. Apparatus for filtering dispersions comprising a set of filters connected in parallel between a supply header and a discharge header therefor, a second set of filters connected in parallel between a supply header and a discharge header therefor, a supply conduit, a discharge conduit, a set of four four-way valves arranged at the corners of a quadrilateral conduit system, each valve having four ports, of which two are connected with the adjacent ports of the adjacent valves, the third port of two adjacent valves being connected together, the remaining port of one of the last-mentioned adjacent valves being connected to the supply conduit, the remaining port of the other of the last-mentioned adjacent valves being connected to the supply header of the second set of filters, the adjacent port of another valve adjacent the last-mentioned valve being connected to the discharge header of the first set of filters, the remaining port of said other valve being connected to the discharge conduit, a third port of the remaining valve adjacent the last-mentioned port being connected to the discharge header of the second set of filters, and the remaining port of the last-named valve being connected to the supply header of the first set of filters, and means for simultaneously operating said valves.

EDWIN T. BIRSCH.
WILLIAM D. SILCOX.

REFERENCES CITED

The following references are of record in the file of this patent:

UNITED STATES PATENTS

| Number | Name | Date |
|---|---|---|
| 268,971 | Abbott | Dec. 12, 1882 |
| 431,229 | Jewell | July 1, 1890 |
| 444,754 | Knight | Jan. 13, 1891 |
| 535,366 | Field | Mar. 12, 1895 |
| 629,942 | Wanner, Jr. | Aug. 1, 1899 |
| 805,374 | McDonald | Nov. 21, 1905 |
| 844,438 | Bayley | Feb. 19, 1907 |
| 1,328,045 | Hills | Jan. 13, 1920 |
| 2,214,671 | Hagan | Sept. 10, 1940 |